United States Patent Office
3,168,838
Patented Feb. 9, 1965

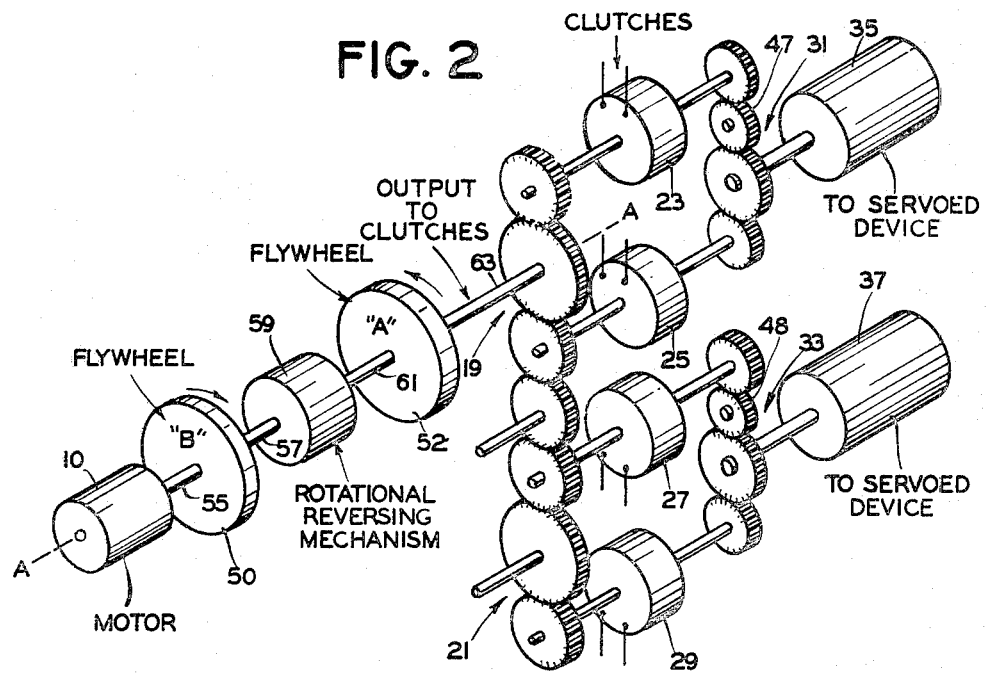
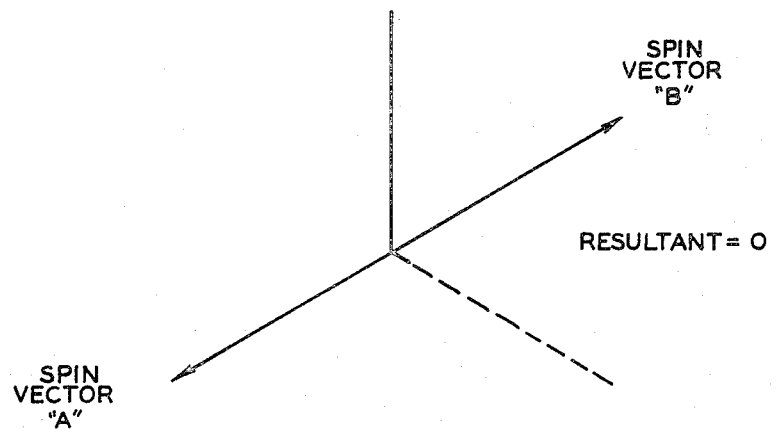

3,168,838
MULTIPLEXED SERVO SYSTEMS WITH INERTIAL REACTION TORQUE COMPENSATION
Arthur Simon, Fair Lawn, and Gifford A. Weber, Wayne, N.J., assignors to The Bendix Corporation, Teterboro, N.J., a corporation of Delaware
Filed Sept. 18, 1962, Ser. No. 224,362
1 Claim. (Cl. 74—388)

This invention relates to a multiplexed servo system with inertial reaction torque compensation and more particularly to an energy source multiplexing system in which the energy stored in a relatively large flywheel may be shared through the use of a plurality of parallel clutch elements, and in the provision of such a system in which the stored energy may be in a form of two relatively smaller flywheels rotating around the same axis in order to reduce the resultant axial spin-vector to zero so as not to apply any precessional torque to a spacecraft in which the same may be operatively arranged as would otherwise be the case in the provision of a similar large flywheel rotating about such a shaft axis.

Current models of servoed instruments consume approximately 6 to 11 watts per servoed channel when operating. Assuming similar static positioning and dynamic response characteristics in instrumentation for an aerospace vehicle; it has become evident that the use of many straight forward position servomechanisms without some form of multiplexing must be excluded from such vehicles.

An object of the invention is to provide a novel method of reducing the power, weight, and size of servo devices by multiplexed utilization.

Another object of the invention is to provide a device so arranged as to effect compensation for spin-vector effects in the multiplexed energy source by using counter-rotating axial flywheels.

Another object of the invention is to provide a system for sharing the energy stored in a relatively large flywheel through use of a system of arranged miniaturized parallel magnetic clutches.

Another object of the invention is to provide a novel motor driven flywheel as a source of energy including two relatively smaller flywheels counter-rotating about the same shaft axis in order to reduce the resultant axial spin-vector to zero so as not to apply during a prolonged maneuver any precessional torque to a spacecraft in which the same may be operatively arranged.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claim for a definition of the limits of the invention.

In the drawings:

FIGURE 2 is a schematic showing illustrating a system embodying a plurality of parallel arranged clutches, and in which system there is provided a multiplexed energy source including a pair of counter rotating axially arranged flywheels.

FIGURE 3 is a vector diagram illustrating the compensating effect provided by the arrangement of FIGURE 2.

Figure 1:
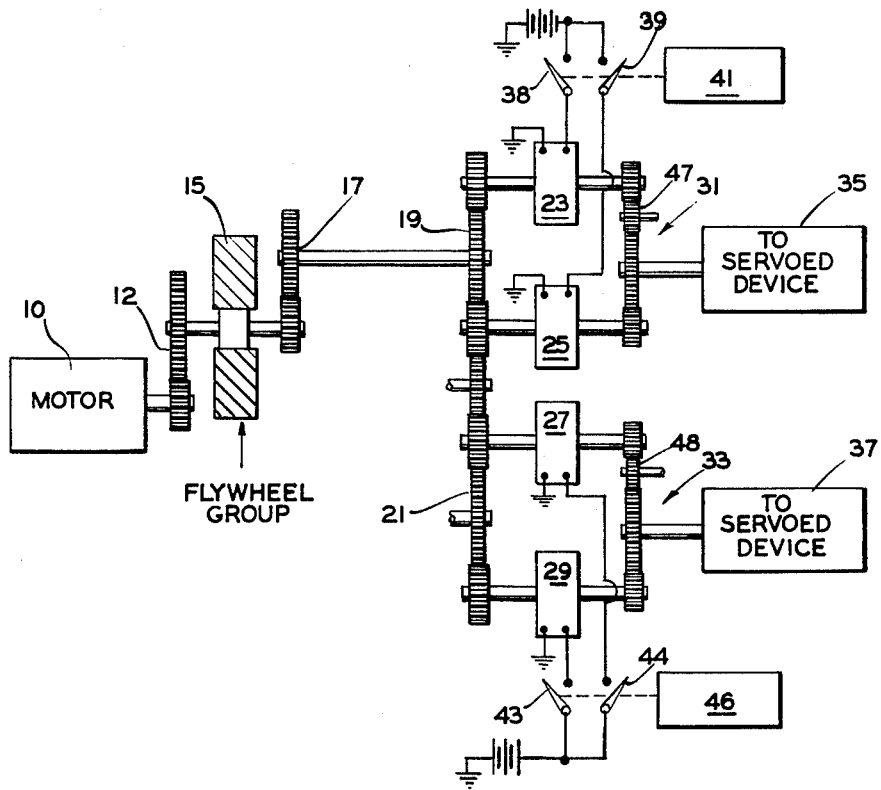
FIGURE 1 is a schematic showing of an energy source multiplexing system in which a plurality of parallel arranged clutches are utilized for sharing energy stored in a relatively large flywheel and through which clutches the energy stored in the flywheel may be applied to suitably servoed devices.

Referring to the drawing of FIGURE 1, there is indicated by the numeral 10 a motor driving gear 12 and through the gear 12 a suitable flywheel indicated by the numeral 15 which in turn drives through a gear 17 the multiplexed gearing 19 and 21 for driving parallel arranged clutch elements 23 and 25 as well as parallel arranged clutch elements 27 and 29 for in turn driving gearings 31 and 33, respectively, and therethrough suitable servoed devices 35 and 37, respectively. The clutch elements 23, 25, 27, and 29 may be of the electromagnetically operated clutch types.

Moreover, the clutches 23 and 25 are shown schematically in FIGURE 1 in an arrangement such as to be selectively operable by switch mechanism 38 and 39 to open and close suitable energizing circuits for the electromagnetically operated clutches 23 and 25 through the provision of a suitable control 41 which may be of an operator-operative type or of a type responsive to a sensed condition. The clutches 27 and 29 are similarly arranged so as to be selectively operable by the arrangement of switch mechanisms 43 and 44 to open and close suitable energizing circuits for the electromagnetically operated clutches 27 and 29 through the provision of a suitable control 46 which may similarly be of an operator-operative type or of a type responsive to a sensed condition.

An idler gear 47 is shown in the gearing 31 between the clutch 23 and the servoed device 35 so as to effect a rotation of the servoed device 35 in one direction upon the clutch 23 being rendered effective while rotation of the servoed device 35 in an opposite direction is effected upon the clutch 25 being alternately rendered effective by the selective operation of the control 41. An idler gear 48 is also provided in the gearing 33 between the clutch 27 and the servoed device 37 so as to effect a rotation of the servoed device 37 in one direction upon the clutch 27 being rendered effective while rotation of the servoed device 37 in an opposite direction is effected upon the clutch 29 being alternately rendered effective by the selective operation of the control 46.

In the proposed system of FIGURE 1, the arrangement for sharing the energy stored in the relatively large flywheel 15 is such that the parallel magnetic clutches 23 and 25 and 27 and 29 may be of a suitable on-off type or may be of a conventional proportional type.

In the on-off type clutches, the traditional problem with a system of this sort has been that of achieving stability. Conventional control circuitry may be utilized for magnetically controlled on-off type clutches of a type to transform digital error magnitude into pulse length. By the use of a system of this type with appropriate scanning rates and sufficiently responsive clutches, stability may be maintained, and the excitation of such magnetically controlled clutches may be such that there is no quiescent power requirement.

However, in the hysteresis type clutches, in order to assure that the necessary torque becomes available with small power input, it may be necessary to bias them at approximately ¼ to ½ of their normal current so that hysteresis in the clutches may be held to practically zero (less than 1%) through the use of superior magnetic material and close dimensional controls.

The exact physical size of the flywheel 15 may be best determined by the number of channels to be driven, the flight envelope of the vehicle, and, of course, the physical limitations to the size of the flywheel 15.

*Modified form of the invention*

In the modified form of the invention shown by FIGURE 2, it has been found desirable to substitute for the relatively large flywheel 15 of FIGURE 1 two smaller flywheels 50 and 52, and in which arrangement the motor 10 drives through a shaft 55 the flywheel 50 in one direction and through a shaft 57, rotational reversing mechanism 59 of conventional type and shaft 61 a second flywheel 52 in an opposite direction to that of the flywheel 50, as indicated by the arrows. The flywheel 52 is in turn drivingly connected through a shaft 63 to the multiplexing gearings 19 and 21, as shown in FIGURES 1 and 2. Suitable control circuits, as heretofore explained, may be provided to selectively operate the electromagnetc clutches 23, 25, 27, and 29, shown in FIGURE 1.

In the aforenoted arrangement, it will be seen that the flywheels 50 and 52 are so arranged as to counter rotate about the same shaft axis A—A, as shown in FIGURE 2, in order to reduce the resultant axial spin-vector, as shown vectorially in FIGURE 3 to zero, so that such arrangement when provided in a space craft does not apply any precessional torque to the space craft during a prolonged maneuver.

There is thus provided by the aforenoted arrangements, a novel method of reducing the power, weight, and size of servoed devices by multiplexed energy source utilization and there is further provided novel means for effecting compensation for spin vector effects in a multiplexed energy source by using the counter rotating axial flywheels 50 and 52, as shown in FIGURE 2.

While two embodiments of the invention have been illustrated and described, various changes in the form and relative arrangements of the parts, which will now appear to those skilled in the art may be made without departing from the scope of the invention. Reference is, therefore, to be had to the appended claim for a definition of the limits of the invention.

What is claimed is:

A multiplexed servo system comprising a motor, an inertial means driven by the motor, a plurality of servoed devices, means to drivingly connect the inertial means to the servoed devices, said connecting means including a plurality of parallel connected clutching means, said inertial means including a pair of flywheels, one of said flywheels being driven by the motor in one sense, a rotational reversing mechanism drivingly connecting the one flywheel to the other flywheel so that the other flywheel is driven in an opposite direction to that of the first-mentioned one flywheel, and said other flywheel being operatively connected through said connecting means to said servoed devices, and said flywheels being of equal size and so arranged as to be driven in counter rotating senses about the same shaft axis so as to reduce the resultant axial spin-vector substantially to zero.

References Cited in the file of this patent

UNITED STATES PATENTS

| | | |
|---|---|---|
| 660,679 | Chauveau | Oct. 30, 1900 |
| 798,682 | Kent | Sept. 5, 1905 |
| 1,044,022 | Cloud | Nov. 12, 1912 |
| 3,069,911 | Carrington et al. | Dec. 25, 1962 |

FOREIGN PATENTS

| | | |
|---|---|---|
| 295,047 | Great Britain | June 27, 1929 |